(12) United States Patent
Yamada (10) Patent No.: US 10,917,474 B2
(45) Date of Patent: Feb. 9, 2021

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Tetsuya Yamada, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/459,967

(22) Filed: Jul. 2, 2019

(65) Prior Publication Data

US 2020/0021659 A1    Jan. 16, 2020

(30) Foreign Application Priority Data

Jul. 10, 2018    (JP) ................. 2018-131012

(51) Int. Cl.
*H04L 29/08*    (2006.01)
*H04L 29/06*    (2006.01)

(52) U.S. Cl.
CPC ............ *H04L 67/141* (2013.01); *H04L 63/08* (2013.01); *H04L 63/168* (2013.01); *H04L 67/02* (2013.01);
(Continued)

(58) Field of Classification Search
CPC ......... G06F 13/00; G06Q 30/02; H04L 29/06; H04L 29/08; H04L 29/0809;
(Continued)

(56) References Cited

U.S. PATENT DOCUMENTS

2002/0133636 A1 *   9/2002   Venkatraman ...... H04L 12/2803
                                                                719/311
2006/0087682 A1 *   4/2006   Lee ...................... H04N 1/0035
                                                                358/1.15

(Continued)

FOREIGN PATENT DOCUMENTS

JP    5669497 B2    2/2015
RU    2571577 C2    12/2015

*Primary Examiner* — Robert B Harrell
(74) *Attorney, Agent, or Firm* — Canon U.S.A., Inc. I.P. Division (57) ABSTRACT

An apparatus includes HTTP and HTTPS servers and an application, provides a content of the application, according to receiving external access, to the HTTP or HTTPS servers, and includes authentication and management units. The authentication unit provides an authentication screen according to the HTTP or HTTPS servers receiving the access from a web browser in a non-login state, and conducts authentication based on information. The management unit manages session information generated by the HTTP or HTTPS servers when the authentication is successful. When managing the HTTPS server generated session information, the management unit manages identification information indicating that the web browser has been subjected to the authentication accompanying the access to the HTTPS server separately from the session information, the web browser is redirected to the HTTPS server when it is confirmed that the identification information is managed. The HTTP server, instead of the HTTP server, provides the application content.

18 Claims, 10 Drawing Sheets

(52) U.S. Cl.
CPC ........ *H04L 67/1014* (2013.01); *H04L 67/146* (2013.01)

(58) Field of Classification Search
CPC ......... H04L 29/06047; H04L 29/08072; H04L 29/08144; H04L 63/08; H04L 63/168; H04L 67/00; H04L 67/02; H04L 67/141; H04L 67/142; H04L 67/146; H04L 67/1014
USPC ................................................ 709/203, 225
See application file for complete search history.

(56) References Cited

U.S. PATENT DOCUMENTS

| | | |
|---|---|---|
| 2010/0284035 A1 | 11/2010 | Kil |
| 2010/0302590 A1* | 12/2010 | Matsubayashi ....... G06F 3/1206 358/1.15 |
| 2012/0154842 A1 | 6/2012 | Hori |
| 2013/0194633 A1 | 8/2013 | Takatsu |
| 2015/0154484 A1 | 6/2015 | Iwasaki |

* cited by examiner

| NAME OF SERVLET | PATH | CONNECTION METHOD |
|---|---|---|
| PRINT | /print | HTTP |
| BOX | /box | HTTP |
| APPLICATION MANAGEMENT | /app | HTTPS |

URL:https://172.24.10.10/print

| PRINT | | LOGOUT |

SELECT FILE

[ ] BROWSE

[ PRINT ]

APPLICATION MANAGEMENT

BOX

FIG.9B

URL:http://172.24.10.10/box

BOX  LOGOUT

SELECT BOX
- BOX 1
- BOX 2
- BOX 3
- BOX 4
- BOX 5
- BOX 6
- BOX 7
- BOX 8
- BOX 9
- BOX 10

APPLICATION MANAGEMENT

PRINT

FIG.9C

URL:https://172.24.10.10/app

APPLICATION MANAGEMENT  LOGOUT

INSTALLED APPLICATION
· CLOUD SCAN  [ STOP ]  [ DELETE ]

INSTALL APPLICATION

[ ] BROWSE

[ INSTALL ]

PRINT

BOX

FIG.10

URL:https://172.24.10.10/login

LOGIN

USERNAME:

PASSWORD:

LOGIN

INFORMATION PROCESSING APPARATUS, METHOD FOR CONTROLLING INFORMATION PROCESSING APPARATUS, AND STORAGE MEDIUM

BACKGROUND

Field

The present disclosure relates to an information processing apparatus, a method for controlling an information processing apparatus, and a storage medium that process a request in conformity with Hyper Text Transfer Protocol (HTTP).

Description of the Related Art

A multifunctional peripheral (MFP) having a copy function and a print function is provided with a web server function of communicating with an external apparatus in a network and performing various kinds of processing. By being provided with the web server function, the MFP can receive a processing request in conformity with Hyper Text Transfer Protocol (HTTP) from the external apparatus, perform processing according to the received processing request, and transmit a result of the processing to the external apparatus. As one example, if the MFP receives a request to acquire a processing state of the MFP (for example, whether the MFP is carrying out a job) from the external apparatus, the MFP returns a response indicating a state of the MFP itself to the external apparatus. Further, if the MFP receives a request for print processing from the external apparatus, the MFP prints data according to the received request, and returns a response indicating a result of this processing to the external apparatus.

Generally, an application that operates on an HTTP server manages an identifier for identifying a state of communication with the external apparatus with use of a cookie. The identifier managed with use of the cookie is, for example, used to determine whether the external apparatus is an external apparatus that has ever issued a request and continue processing with respect to the previous request according to a result of the determination, and used as an identifier for determining whether the current session is a session for which user authentication has been conducted and an expiration period has not passed yet.

For example, if the external apparatus in the network requests processing by the application that operates on the HTTP server, the web server generates an identifier for identifying the external apparatus as a session identification (ID). The web server adds the session ID to the cookie, and requests authentication to a user using the external apparatus. If input authentication information is successfully authenticated, the web server generates a login session ID, adds the session ID and the login session ID to the cookie, and transmits it to the external apparatus.

When the external apparatus requests the processing to the application that operates via the HTTP server again, the external apparatus transmits the processing request together with the session ID received from the MFP. As a result, the MFP recognizes that the transmitted processing request is a processing request from the same external apparatus, and confirms that this session is a valid session, thereby performing the processing.

Further, there is also generally known an MFP equipped with an application that operates on a Hyper Text Transfer Protocol Secure (HTTPS) server, which is an HTTP server with a security function added thereto (an HTTP server that communicates with an HTTP client after encrypting data based on Transport Layer Security (TLS)). There is known a method for, when the application that operates on the HTTP server and the application that operates on the HTTPS server are implemented, managing the identifier for using a different identifier for each of the applications, which is discussed in Japanese Patent No. 5669497.

SUMMARY

According to an aspect of the present disclosure, an information processing apparatus includes a Hyper Text Transfer Protocol (HTTP) server, a Hyper Text Transfer Protocol Secure (HTTPS) server, and an application, and is configured to provide a content of the application according to receiving access from a web browser on a client terminal to any one of the HTTP server or the HTTPS server, the information processing further including an authentication unit configured to provide an authentication screen according to the HTTP server or the HTTPS server receiving the access from the web browser in a non-login state, and to conduct authentication based on authentication information input via the authentication screen, and a management unit configured to manage session information generated by the HTTP server or the HTTPS server in a case where the authentication is successfully performed by the authentication unit, wherein, in a case of managing the session information generated by the HTTPS server, the management unit manages identification information indicating that the web browser has been subjected to the authentication accompanying the access to the HTTPS server separately from the session information, and wherein the HTTP server receiving the access from the web browser redirects the web browser to the HTTPS server in a case where it is confirmed that the identification information is managed by the management unit, and the HTTPS server provides the content of the application instead of the HTTP server providing the content of the application.

An information processing apparatus is configured in such a manner that a Hyper Text Transfer Protocol (HTTP) server receiving access from the web browser redirects a web browser to a Hyper Text Transfer Protocol Secure (HTTPS) server in a case where it is confirmed that identification information is managed by a management unit, and the HTTPS server provides a content of an application instead of the HTTP server. Further features of the present disclosure will become apparent from the following description of exemplary embodiments with reference to the attached drawings.

DESCRIPTION OF THE EMBODIMENTS

Various attributes can be set in a cookie, but an external apparatus is prohibited from transmitting the cookie with a secure attribute set therein in a case of unsecured Hyper Text Transfer Protocol (HTTP) communication according to the protocol specifications. From the viewpoint of security consciousness, a state allowing information to be browsed when being transmitted/received in Hyper Text Transfer Protocol Secure (HTTPS) communication requiring confidentiality will be deemed as an information leak, and the setting of the secure attribute will be included in the required specifications. Then, one issue arises.

When the external apparatus is authenticated to access an HTTPS server and then attempts to access the HTTP server, an information processing apparatus undesirably determines that the session is disconnected and issues an authentication request again because the cookie is not transmitted from the external apparatus if the secure attribute is set therein.

Therefore, the present disclosure is directed to allowing the request from the external apparatus to be processed without determining that the session is disconnected even when the external apparatus accesses the HTTP server after being authenticated to access the HTTPS server.

The request from the external apparatus is processed without determining that the session is disconnected even when the external apparatus accesses the HTTP server after being authenticated to access the HTTPS server.

In the following description, an exemplary embodiment of the present disclosure will be described in detail with reference to the drawings. However, the exemplary embodiment that will be described below is not intended to limit the scope of the claims, and, further, not all of combinations of features that will be described in the exemplary embodiment are necessarily essential to a solution of the disclosure.

A first exemplary embodiment of the present disclosure will be described.
<System Configuration>

Figure 1:
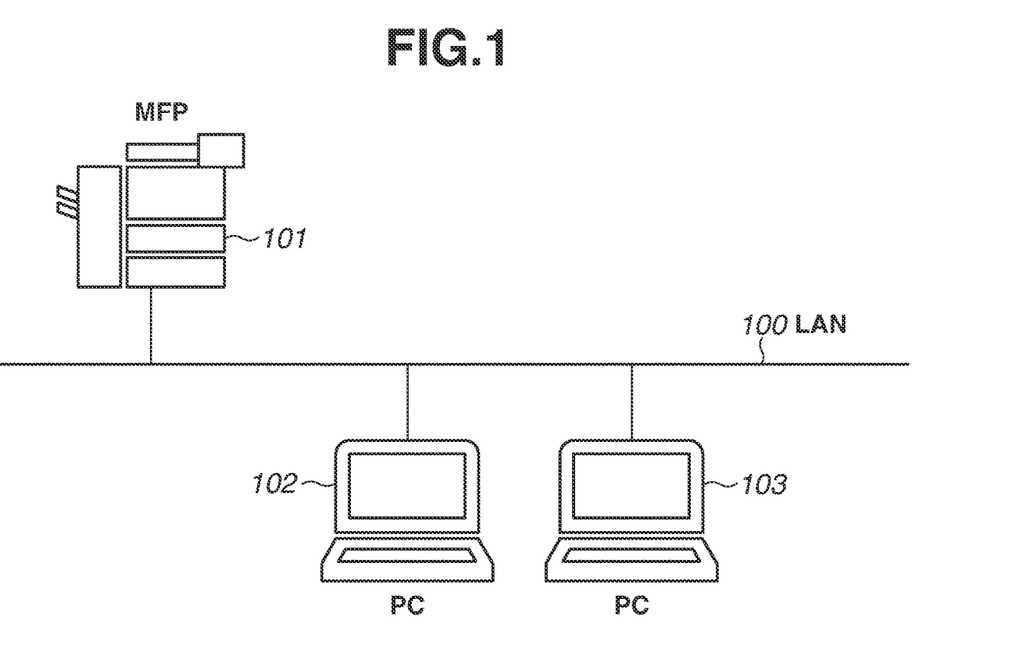
FIG. 1 illustrates a system configuration relating to a multifunctional peripheral (MFP).

FIG. 1 illustrates an entire system relating to a multifunctional peripheral (MFP) 101. The MFP 101 and a plurality of external apparatuses are connected to a local area network (LAN) 100. The external apparatuses connected in the present exemplary embodiment are assumed to be a personal computer (PC) 102 and a PC 103. The MFP 101 is an apparatus having a plurality of functions, such as a scan function, a facsimile function, a print function, an electronic mail function, a web browser function, and a web server function.

In the first exemplary embodiment, by having the web server function, the MFP 101 can perform processing according to a request from a web browser in a PC or a dedicated web client and return a result of the processing. For example, if the request from the web browser is a request to browse a state of the MFP 101, the MFP 101 acquires state information about the MFP 101 and transmits the acquired information to the web browser. Further, if the request from the web browser is a request to configure a network setting of the MFP 101, the MFP 101 can configure the network setting according to a parameter contained in this request.

The MFP 101 has a function as a web server that provides the above-described scan function and print function of the MFP 101 as a web service. More specifically, the MFP 101 can perform, for example, scan, print, and network transmission processing according to the request from the web browser or another dedicated HTTP client. FIG. 1 illustrates only a single MFP, but a plurality of MFPs may be connected to the LAN 100.

The PC 102 is a client terminal that includes the web browser and can establish an HTTP connection or an HTTPS connection to a web application in the MFP 101 via the LAN 100 and request processing thereto.
<Hardware Configuration>

Figure 2:
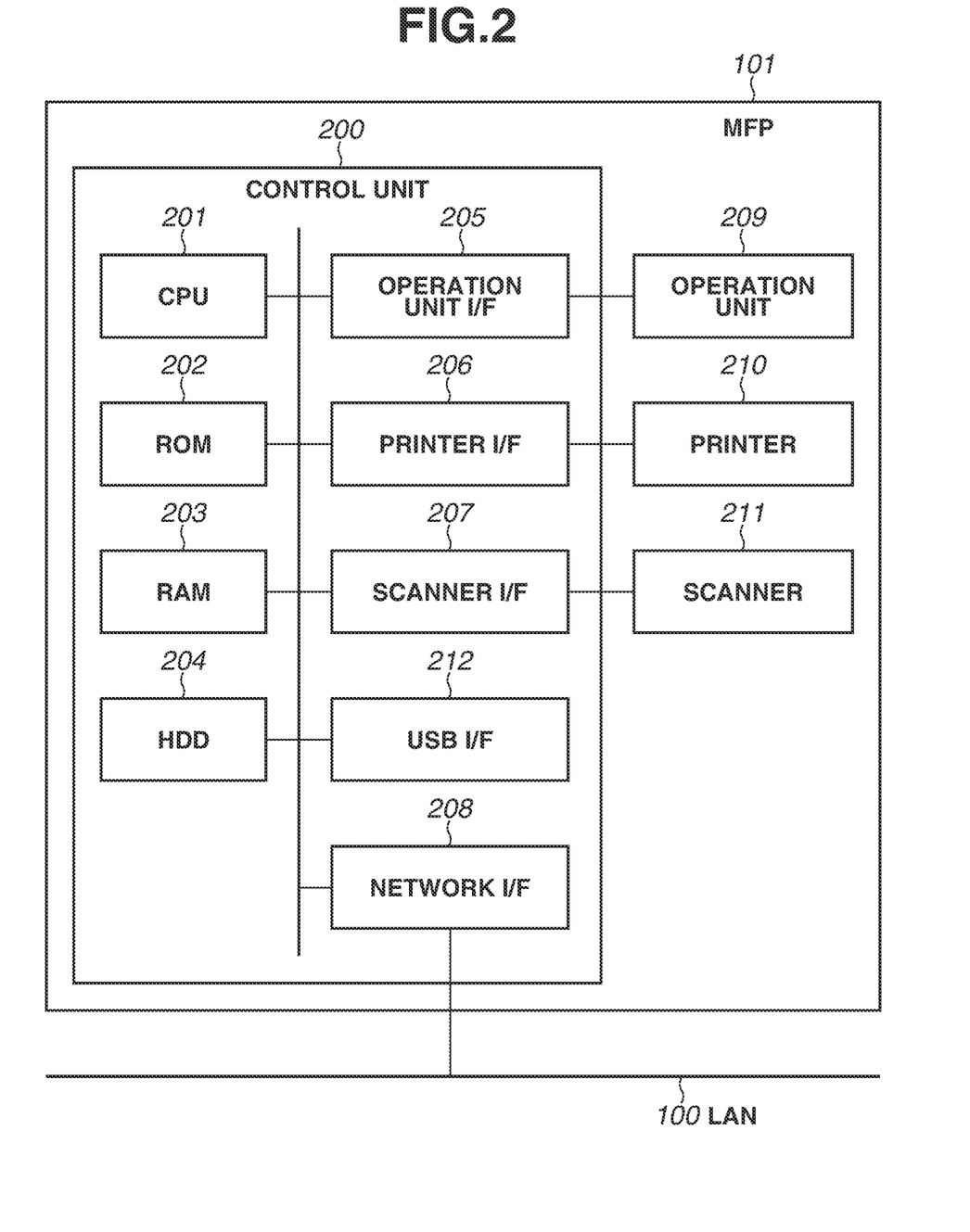
FIG. 2 is a block diagram illustrating a configuration of hardware of the MFP.

FIG. 2 is a hardware block diagram illustrating a configuration of the MFP 101, which is one type of information processing apparatus. A control unit 200 including a central processing unit (CPU) 201 controls an operation of the entire MFP 101. The CPU 201 reads out a control program stored in a read only memory (ROM) 202, and performs various kinds of control of readout, transmission, and the like. A random access memory (RAM) 203 is used as a temporary storage area, such as a main memory and a work area of the CPU 201.

A hard disk drive (HDD) 204 stores image data and various kinds of programs therein. An operation unit interface (I/F) 205 connects an operation unit 209 and the control unit 200 to each other. A printer I/F 206 connects a printer 210 and the control unit 200 to each other. Image data that is to be printed by the printer 210 is transferred from the control unit 200 via the printer I/F 206, and is printed on a recording medium by the printer 210.

A scanner I/F 207 connects a scanner 211 and the control unit 200 to each other. The scanner 211 reads out an image on an original document to generate image data, and inputs the generated image data to the control unit 200 via the scanner I/F 207. A network I/F 208 connects the control unit 200 (the MFP 101) to the LAN 100. The network I/F 208 transmits/receives various kinds of information between the MFP 101 and an external apparatus in the LAN 100.
<Software Configuration>

Figure 3:
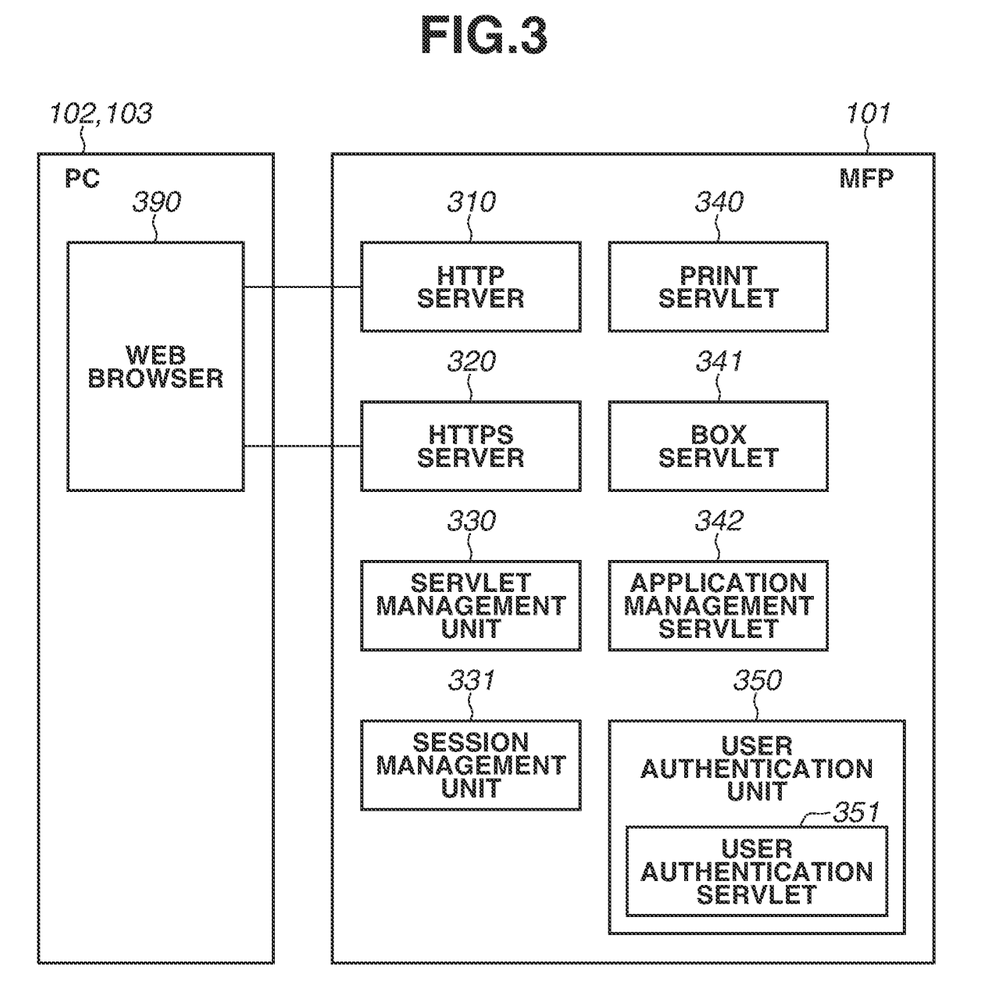
FIG. 3 is a block diagram illustrating a configuration of software of the MFP.

A software configuration of the MFP 101 will be described with reference to FIG. 3. Each of functions of the MFP 101 that will be described below is realized by the CPU 201 loading the program stored in the ROM 202 or the HDD 204 into the RAM 203 and executing the loaded program. A web browser 390 included in the PC 102 or 103 can display, on a display device (not illustrated) of the PC 102, a Hyper Text Markup Language (HTML) content that the web browser 390 acquires by accessing an HTTP server 310 or an HTTPS server 320. The HTML content refers to data described in HTML (Hyper Text Markup Language). The PC 103 also has a similar function to the PC 102.

The HTTP server 310 and the HTTPS server 320 receive the request from the web browser 390, requests a servlet application (340 to 342, hereinafter referred to as a servlet) that is a request destination to provide the HTML content or another service, and returns a result thereof to the request source.

If the request is issued from the web browser 390 in the form of "http://an Internet Protocol (IP) address of the MFP 101 (the 80th port)/a path of the servlet", the HTTP server 310 processes then request. The "path of the servlet" will be described below. Further, if the request is issued in the form of "https://the IP address of the MFP 101 (the 443th port)/the path of the servlet", the HTTP server 320 processes the request. The HTTPS server 320 allows communication to be encrypted, data to be prevented from being tampered, and a communication partner to be authenticated by incorporating Transport Layer Security (TLS). For a user highly conscious of security, the MFP 101 allows the user to selectively use an "all communication exchange TLS mode", in which all communication exchanges are carried out based on TLS.

Figure 9A:
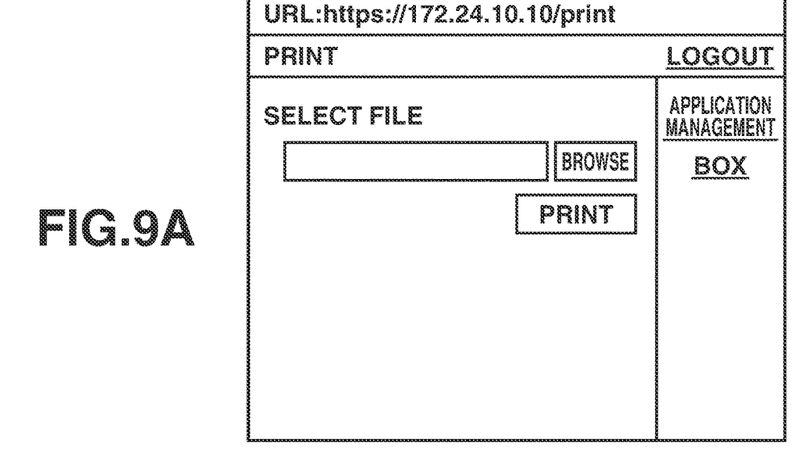
FIGS. 9A, 9B, and 9C illustrate examples of screens of servlet applications.
Figure 9B:
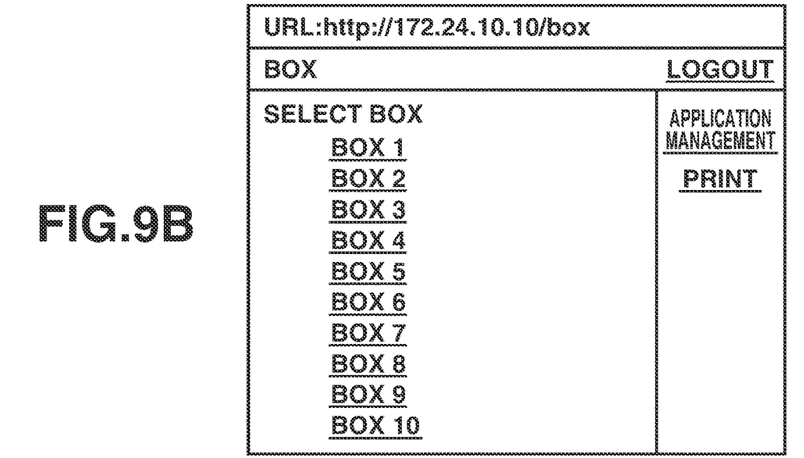
Figure 9C:
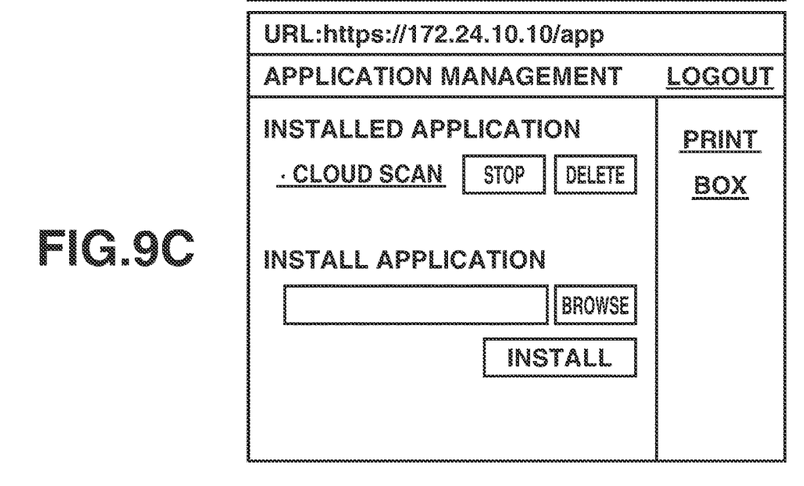

A print servlet 340 has a function of printing a document/image uploaded from the web browser 390 with use of the printer 210. FIG. 9A illustrates a screen thereof. A box servlet 341 has a function of, for example, transmitting a document stored in a predetermined storage area in the HDD 204 which is called a box via the network I/F 208 or printing this document with use of the printer 210. FIG. 9B illustrates a screen for selecting the box on which the work is engaged in. An application management servlet 342 has a function of, for example, allowing an application uploaded from the web browser 390 to be installed, starting, stopping, and uninstalling the application, and displaying a list. FIG. 9C illustrates a screen thereof.

A user authentication unit 350 includes a user authentication servlet 351, which manages a user that can use the MFP 101, and provides an authentication screen in response to a request from the HTTP server 310 or the HTTPS server 320. The user authentication servlet 351 controls content transmission to the web browser 390 by receiving authentication information via the authentication screen provided in response to the request from the HTTP server 310 or the HTTPS server 320, and performing authentication processing with use of a commonly used authentication technique.

Figure 4:
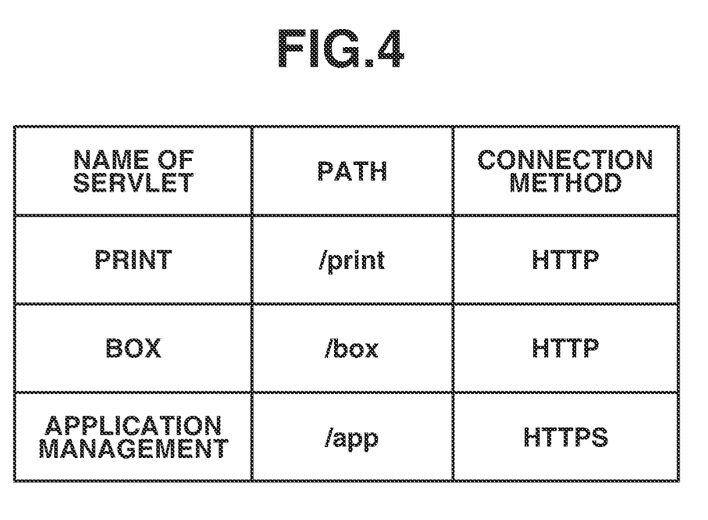
FIG. 4 illustrates an example of management by a servlet management unit.

A servlet management unit 330 manages the servlet that the HTTP server 310 and the HTTPS server 320 target for the processing. FIG. 4 illustrates information managed by the servlet management unit 330. A "path" serves as an identifier specified when the web browser 390 issues the request to the target servlet application. If "always TLS" is set to "YES", a connection request is handled so as to be redirected and processed by the HTTPS server 320 even when being addressed to the HTTP server 310. For each of the servlet applications (340 to 342), processing for registering with the servlet management unit 330 is performed as processing to be executed when the MFP 101 is started up. At this time, information such as the "path" and "always TLS" is registered.

Figure 5:
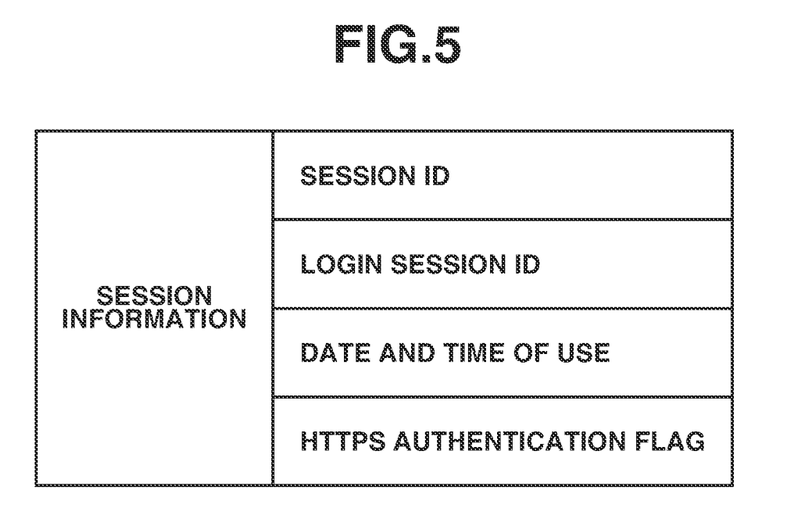
FIG. 5 illustrates an example of information managed by a session management unit.

A session management unit 331 identifies a session (a series of communication exchanges from a start of communication with a web browser) and manages a state thereof. FIG. 5 illustrates session information managed by the session management unit 331. A "session identification (ID)" and a "login session ID" are a cookie for identifying a connection source, and a cookie for identifying valid user authentication, respectively. A "date and time of use" is a date and time when the session information is used (referred to). An "HTTPS authentication flag" stores whether the user is authenticated at the time of the processing in the HTTPS server 320 as YES/NO. Upon receipt of the request from the web browser 390, the HTTP server 310/HTTPS server 320 inquires of the session management unit 331 and determines whether this request is a valid session.

<Sequence and Processing Flow>

Figure 6:
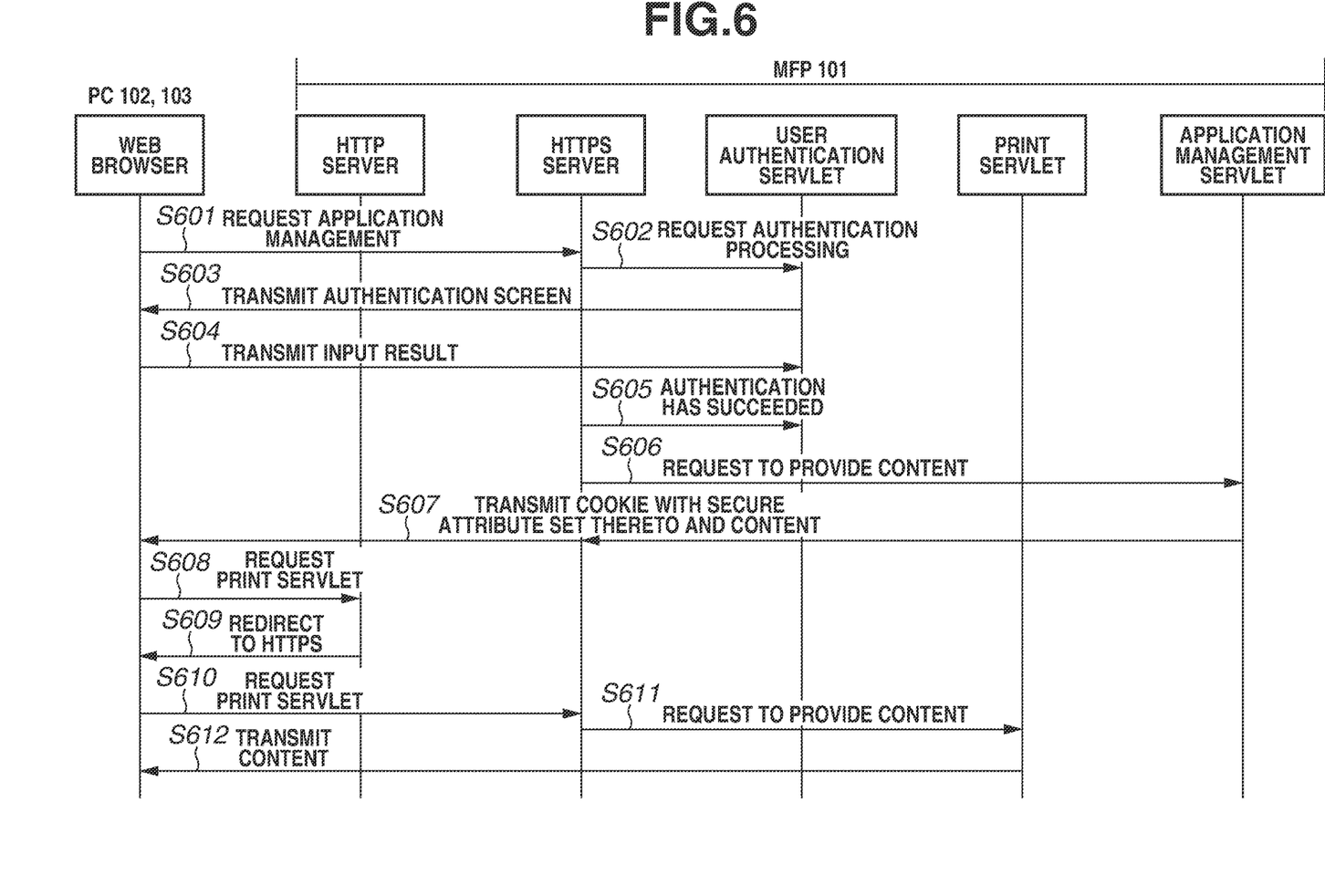
FIG. 6 illustrates a communication sequence between a web browser and the MFP.
Figure 10:
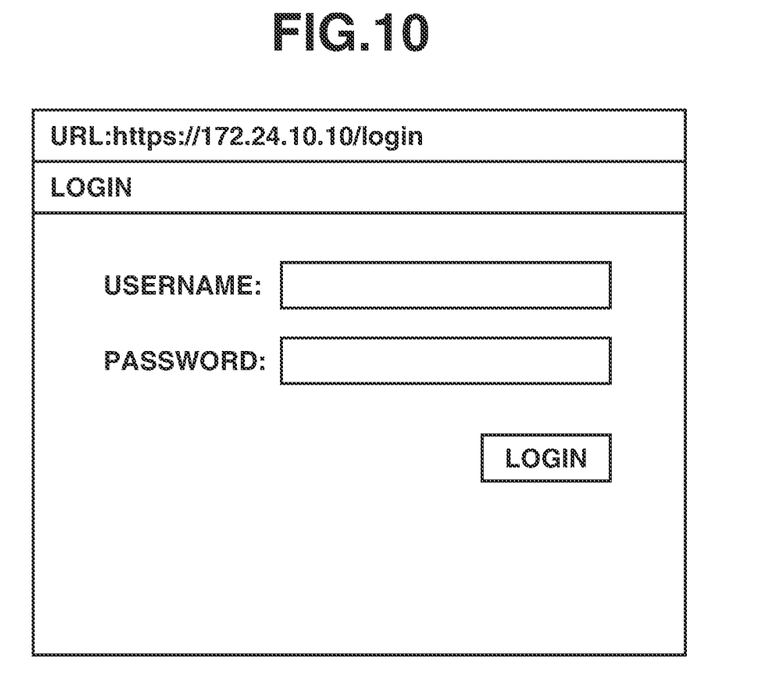
FIG. 10 illustrates an example of an authentication screen.

FIG. 6 is a sequence diagram of a case characteristically indicating a processing procedure between the web browser 390 and the MFP 101 that can be realized by the present exemplary embodiment. First, in step S601, the web browser 390 issues a request of the "application management" servlet 342, the connection method of which is HTTPS, while explicitly specifying HTTPS like "https://the IP address of the MFP 101 (the 443th port)/app". In step S602, the HTTPS server 320 determines that this request is a request issued from the web browser 390 for the first time and the cookie of the login session is not added thereto, and requests the authentication processing to the user authentication servlet 351. The request issued for the first time indicates that the login session is not yet provided to the web browser 390 or the already provided login session is invalidated, i.e., the web browser 390 requests access in a non-login state. In step S603, the user authentication servlet 351 generates the authentication screen and transmits the generated screen via the HTTPS server 320. FIG. 10 illustrates an example of the authentication screen, and indicates that a Uniform Resource Locator (URL) is https.

In step S604, the user authentication servlet 351 receives the authentication information input by the user that is transmitted from the web browser 390, and performs the authentication processing. If indication of a success in the authentication and a specific result of the authentication processing are returned in step S605, in step S606, the HTTPS server 320 requests the application management servlet 342 to provide the content.

In step S607, the HTTPS server 320 generates the login session, sets the secure attribute to the cookie and also sets the login session ID for identifying the login session thereto, and transmits the cookie to the web browser 390 together with the generated content. At the same time, the HTTPS server 320 registers the session with the session management unit 331 and sets YES as the "HTTPS authentication flag" of the registered session.

In the first exemplary embodiment, the MFP 101 uses the method that sets YES as the flag when the web browser 390 has been subjected to the authentication accompanying the access to the HTTPS server 320, but may use a method that stores information indicating that the web browser 390 has been subjected to the authentication. In either case, identification information in any form may be used as long as the identification information allows the HTTP server 310/HTTPS server 320 to identify that the web browser 390 has been subjected to the authentication accompanying the access to the HTTPS server 320.

FIG. 9C illustrates an example of the displayed content, and indicates that the URL is https. Next, a user operation selects a link labeled "PRINT" on the screen example illustrated in FIG. 9C, by which, in step S608, the web browser 390 issues a content request based on HTTP like "http://the IP address of the MFP 101 (the 80th port)/print". At this time, the secure attribute is added to the cookie of the login session, and therefore the web browser 390 does not transmit the cookie.

In step S609, the HTTP server 310 notifies the web browser 390 so as to be redirected based on HTTPS by processing that will be described below. Then, in step S610, the web browser 390 issues the request again based on HTTPS. At this time, the cookie of the login session is transmitted because this connection is an HTTPS connection.

In step S611, the HTTPS server 320 confirms that the cookie of the login session in the received data is valid, and requests the print servlet 340 to provide the content. In step S612, the print servlet 340 transmits the content. FIG. 9A illustrates an example of the displayed content, and indicates that the URL is https.

Figure 7:
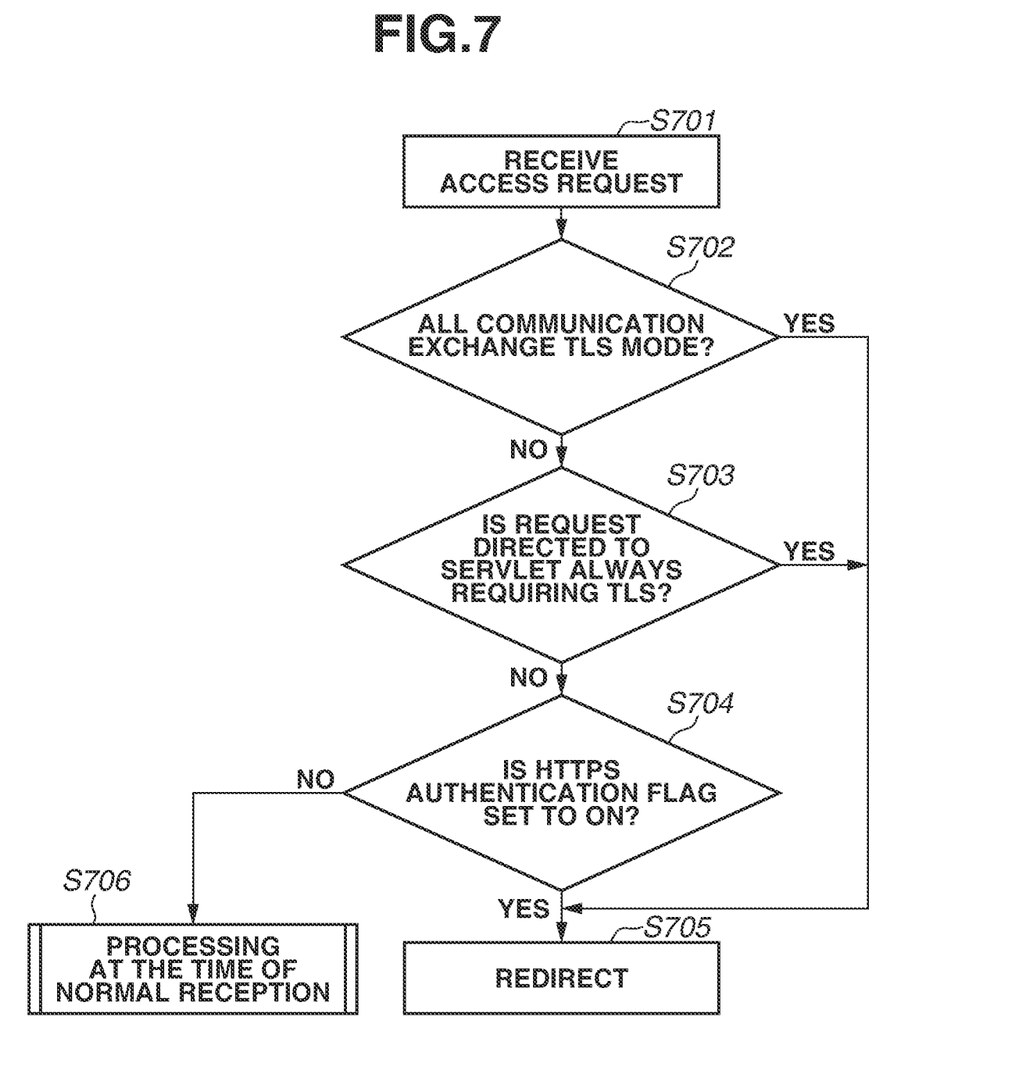
FIG. 7 is a flowchart relating to redirection processing performed by a Hyper Text Transfer Protocol (HTTP) server.

A determination flow by the HTTP server 310 when the redirection processing is performed in step S609 in the sequence illustrated in FIG. 6 will be described with reference to a flowchart illustrated in FIG. 7. In step S701, the HTTP server 310 receives the access request from the web browser 390. Next, in step S702, the HTTP server 310 confirms whether the "all communication exchange TLS mode" is set to the MFP 101. If the determination result is YES (YES in step S702), in step S705, the HTTP server 310 performs the redirection processing. If the determination result is NO (NO in step S702), in step S703, the HTTP server 310 inquires of the servlet management unit 330 about the setting of the servlet application.

Then, the HTTP server 310 confirms whether the requested servlet application is the servlet corresponding to "always TSL" based on a result of the inquiry. If the determination result is YES (YES in step S703), the processing proceeds to step S705. In step S705, the HTTP server 310 performs the redirection processing. If the determination result is NO (NO in step S703), the processing proceeds to step S704. In step S704, the HTTP server 310 inquires of the session management unit 331 to confirm whether the current session is a session authenticated in an HTTPS session. If the determination result is YES (YES in step S704), the processing proceeds to step S705. In step S705, the HTTP server 310 performs the redirection processing. The HTTP server 310 determines the identification of the current session based on the cookie. If the determination result is NO (NO in step S704), the processing proceeds to step S706. In step S706, the HTTP server 310 performs request reception processing.

Figure 8:
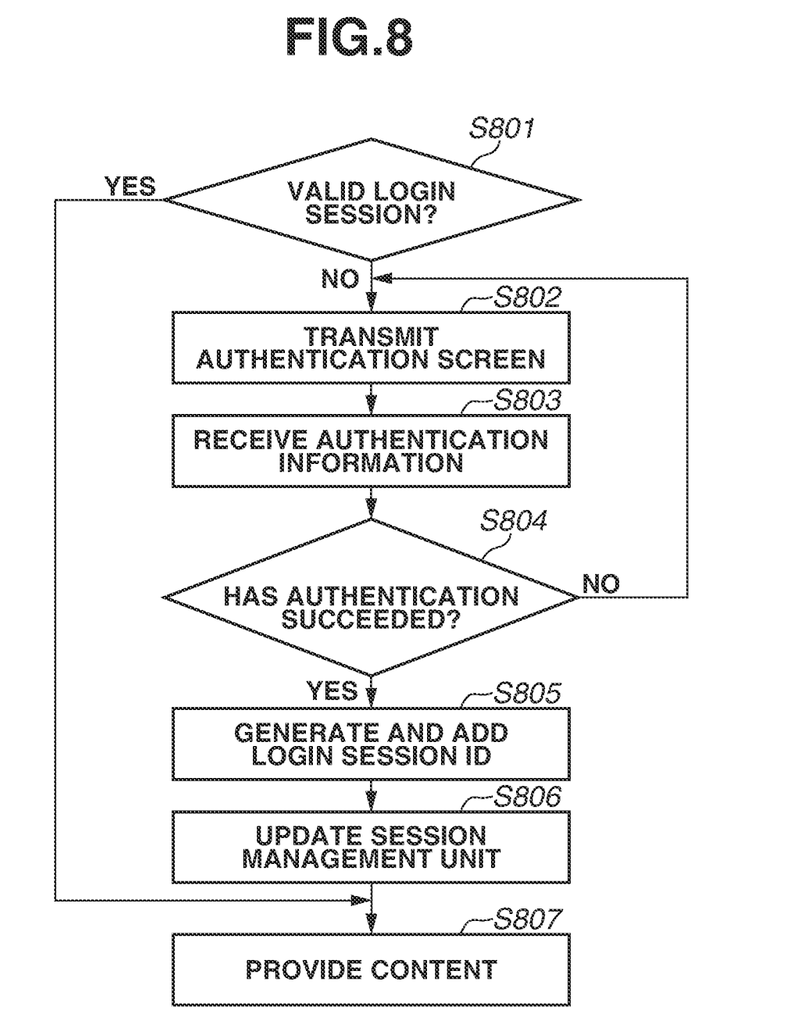
FIG. 8 is a flowchart of request reception processing performed by the HTTP server or a Hyper Text Transfer Protocol Secure (HTTPS) server.

The request reception processing will be described with reference to a flowchart illustrated in FIG. 8. The flowchart illustrated in FIG. 8 is not limited to the processing performed by the HTTP server 310 in step S706, and is applied even to the HTTPS server 320 as long as the web browser 390 is in the non-login state.

In step S801, the HTTP server 310/HTTPS server 320 confirms whether there is the cookie of the login session. If there is the cookie of the login session, the HTTP server 310/HTTPS server 320 confirms whether the corresponding cookie is registered with the session management unit 331 and is within an expiration period. If the validity of the session is confirmed as a result of the confirmation (YES in step S801), the processing proceeds to step S807. In step S807, the HTTP server 310/HTTPS server 320 performs content provision processing. If the session is not valid (NO in step S801), the processing proceeds to step S802. In step S802, the HTTP server 310/HTTPS server 320 transmits, to the web browser 390, the authentication screen generated by the user authentication servlet 351. Then, in step S803, the HTTP server 310/HTTPS server 320 receives the authentication information input to the web browser 390. In step S804, the HTTP server 310/HTTPS server 320 conducts the authentication by the user authentication unit 350, and transmits the authentication screen again if the authentication has failed (NO in step S804).

If the authentication has succeeded (YES in step S804), in step S805, the HTTP server 310/HTTPS server 320 generates the login session and adds the generated login session to the cookie. At this time, the HTTPS server 320 adds the secure attribute thereto if the processing is currently performed by the HTTPS server 320. Next, in step S806, the HTTP server 310/HTTPS server 320 registers or updates the information about the login session with or in the session management unit 331. At this time, the HTTPS server 320 sets YES as the HTTPS authentication flag if the processing is currently performed by the HTTPS server 320, and the session management unit 331 manages the session information. After that, in step S807, the HTTP server 310/HTTPS server 320 performs the content provision processing by each of the servlets.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may include one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-131012, filed Jul. 10, 2018, which is hereby incorporated by reference herein in its entirety.

What is claimed is:

1. An information processing apparatus including a Hyper Text Transfer Protocol (HTTP) server, a Hyper Text Transfer Protocol Secure (HTTPS) server, and an application, and configured to provide a content of the application, according to receiving access from a web browser on a client terminal, to any one of the HTTP server or the HTTPS server, the information processing apparatus comprising:
    an authentication unit configured to provide an authentication screen according to the HTTP server or the HTTPS server receiving the access from the web browser in a non-login state, and to conduct authentication based on authentication information input via the authentication screen; and
    a management unit configured to manage session information generated by the HTTP server or the HTTPS server in a case where the authentication is successfully performed by the authentication unit,
    wherein, in a case of managing the session information generated by the HTTPS server, the management unit manages identification information indicating that the web browser has been subjected to the authentication accompanying the access from the web browser to the HTTPS server separately from the session information, and
    wherein the HTTP server receiving the access from the web browser redirects the web browser to the HTTPS server in a case where it is confirmed that the identification information is managed by the management unit, and the HTTPS server provides the content of the application instead of the HTTP server providing the content of the application.

2. The information processing apparatus according to claim 1, further comprising a setting unit configured to set whether to always use a connection, based on Transport Layer Security (TLS), to the information processing apparatus,
- wherein, if the setting of always using the connection based on TLS is set to the information processing apparatus, the HTTP server receiving the access from the web browser redirects the web browser to the HTTPS server regardless of whether the identification information is managed by the management unit.

3. The information processing apparatus according to claim 2,
- wherein the setting unit performs setting regarding whether to always use the connection based on TLS to the application, and
- wherein, if the setting of always using the connection based on TLS is not set to the information processing apparatus but the setting of always using the connection based on TLS is set to the application, the HTTP server receiving the access from the web browser redirects the web browser to the HTTPS server regardless of whether the identification information is managed by the management unit.

4. The information processing apparatus according to claim 3, wherein, if the setting of always using the connection based on TLS is not set to the information processing apparatus and the setting of always using the connection based on TLS is neither set to the application, the HTTP server receiving the access from the web browser performs control so as to conduct the authentication by the authentication unit.

5. The information processing apparatus according to claim 1, wherein the HTTPS server is configured to add a login session identification (ID) of the session information as well as a secure attribute to a cookie, and to provide the cookie to the web browser.

6. The information processing apparatus according to claim 5, wherein, when receiving the access from the redirected web browser, the HTTPS server confirms whether the cookie received together with the access is valid, and provides the content of the application if the cookie is valid.

7. The information processing apparatus according to claim 1,
- wherein the information processing apparatus includes a printer, and
- wherein the application is a print servlet or a box servlet.

8. The information processing apparatus according to claim 7,
- wherein the information processing apparatus includes a plurality of the applications, and
- wherein the print servlet or the box servlet is set so as to provide the content of the application via the HTTP server, and an application management servlet is set so as to provide the content of the application via the HTTPS server.

9. A method for controlling an information processing apparatus including a Hyper Text Transfer Protocol (HTTP) server, a Hyper Text Transfer Protocol Secure (HTTPS) server, and an application, and configured to provide a content of the application, according to receiving access from a web browser on a client terminal, to any one of the HTTP server or the HTTPS server, the method comprising:
- providing an authentication screen according to the HTTP server or the HTTPS server receiving the access from the web browser in a non-login state, and conducting authentication based on authentication information input via the authentication screen; and
- managing session information generated by the HTTP server or the HTTPS server in a case where the authentication is successfully performed,
- wherein, in a case of managing the session information generated by the HTTPS server, managing includes managing identification information indicating that the web browser has been subjected to the authentication accompanying the access from the web browser to the HTTPS server separately from the session information, and
- wherein the HTTP server receiving the access from the web browser redirects the web browser to the HTTPS server in a case where it is confirmed that the identification information is managed, and the HTTPS server provides the content of the application instead of the HTTP server providing the content of the application.

10. The method according to claim 9, further comprising setting whether to always use a connection, based on Transport Layer Security (TLS), to the information processing apparatus,
- wherein, if the setting of always using the connection based on TLS is set to the information processing apparatus, the HTTP server receiving the access from the web browser redirects the web browser to the HTTPS server regardless of whether the identification information is managed.

11. The method according to claim 10,
- wherein setting includes performing setting regarding whether to always use the connection based on TLS to the application, and
- wherein, if the setting of always using the connection based on TLS is not set to the information processing apparatus but the setting of always using the connection based on TLS is set to the application, the HTTP server receiving the access from the web browser redirects the web browser to the HTTPS server regardless of whether the identification information is managed.

12. The method according to claim 11, wherein, if the setting of always using the connection based on TLS is not set to the information processing apparatus and the setting of always using the connection based on TLS is neither set to the application, the HTTP server receiving the access from the web browser performs control so as to conduct the authentication.

13. The method according to claim 9, wherein the HTTPS server is configured to add a login session identification (ID) of the session information as well as a secure attribute to a cookie, and to provide the cookie to the web browser.

14. The method according to claim 13, wherein, when receiving the access from the redirected web browser, the HTTPS server confirms whether the cookie received together with the access is valid, and provides the content of the application if the cookie is valid.

15. The method according to claim 9,
- wherein the information processing apparatus includes a printer, and
- wherein the application is a print servlet or a box servlet.

16. The method according to claim 15,
- wherein the information processing apparatus includes a plurality of the applications, and
- wherein the print servlet or the box servlet is set so as to provide the content of the application via the HTTP server, and an application management servlet is set so as to provide the content of the application via the HTTPS server.

17. A non-transitory computer-readable storage medium storing a program causing a computer to perform a method for controlling an information processing apparatus including a Hyper Text Transfer Protocol (HTTP) server, a Hyper Text Transfer Protocol Secure (HTTPS) server, and an application, and configured to provide a content of the application, according to receiving access from a web browser on a client terminal, to any one of the HTTP server or the HTTPS server, the method comprising:

providing an authentication screen according to the HTTP server or the HTTPS server receiving the access from the web browser in a non-login state, and conducting authentication based on authentication information input via the authentication screen; and managing session information generated by the HTTP server or the HTTPS server in a case where the authentication is successfully performed, wherein, in a case of managing the session information generated by the HTTPS server, managing includes managing identification information indicating that the web browser has been subjected to the authentication accompanying the access from the web browser to the HTTPS server separately from the session information, and wherein the HTTP server receiving the access from the web browser redirects the web browser to the HTTPS server in a case where it is confirmed that the identification information is managed, and the HTTPS server provides the content of the application instead of the HTTP server providing the content of the application.

18. The non-transitory computer-readable storage medium according to claim 17, the method further comprising setting whether to always use a connection, based on Transport Layer Security (TLS), to the information processing apparatus, wherein, if the setting of always using the connection based on TLS is set to the information processing apparatus, the HTTP server receiving the access from the web browser redirects the web browser to the HTTPS server regardless of whether the identification information is managed.

\* \* \* \* \*